Nov. 14, 1961     C. STIEFEL ET AL     3,008,759
CLOSURE FOR VEHICLES ESPECIALLY RAIL VEHICLES AND TRUCKS
Filed Aug. 18, 1959     2 Sheets-Sheet 1
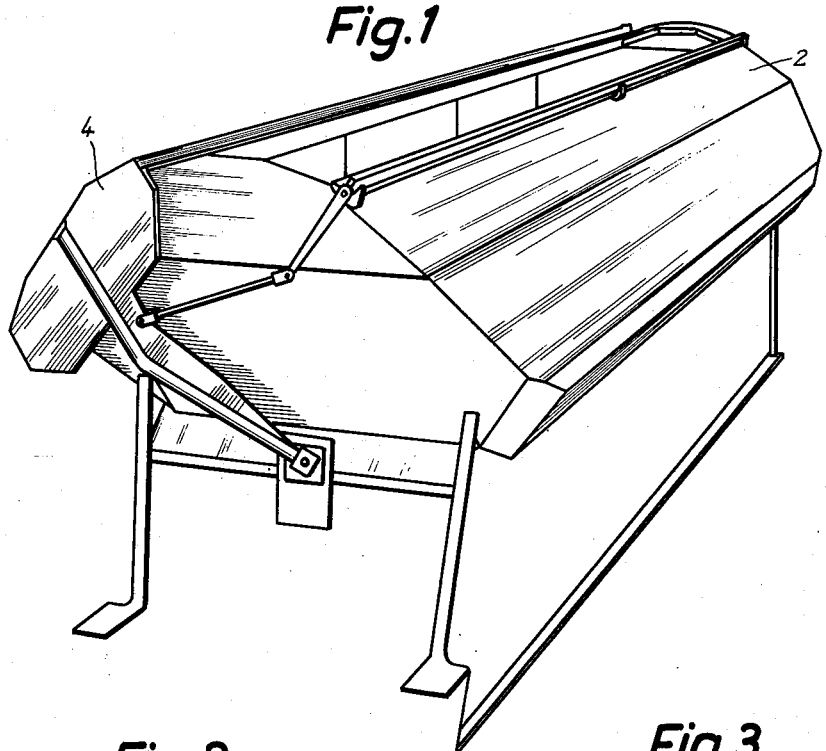
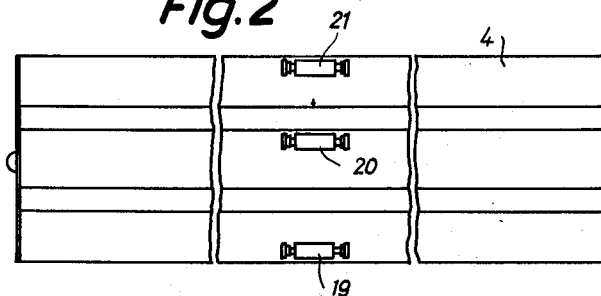
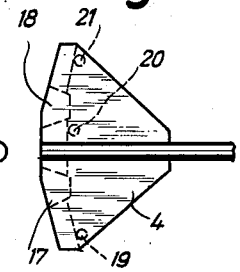
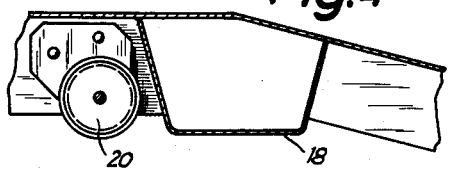
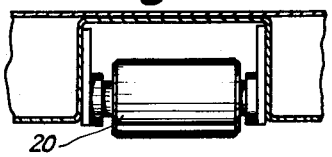
INVENTORS:
Christian Stiefel
Helmut König
BY

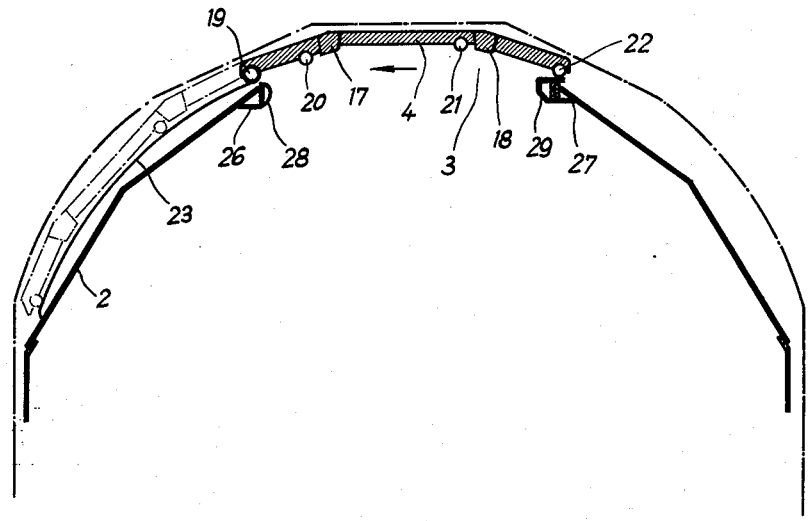
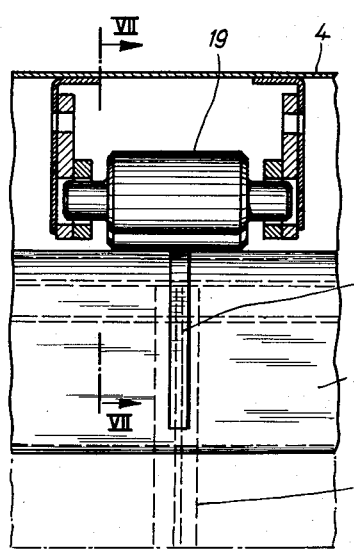
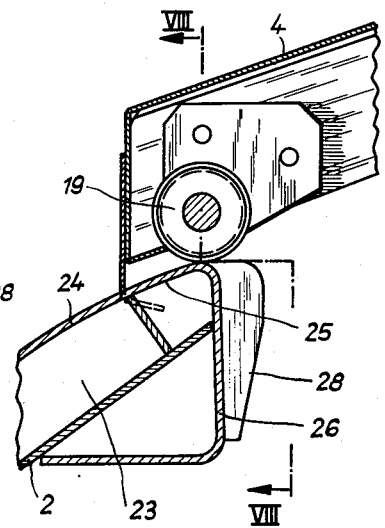

United States Patent Office 3,008,759
Patented Nov. 14, 1961

3,008,759
CLOSURE FOR VEHICLES ESPECIALLY RAIL VEHICLES AND TRUCKS
Christian Stiefel, Aachen, and Helmut König, Minden, Westphalia, Germany, assignors to Waggonfabrik Talbot, Aachen, Germany
Filed Aug. 18, 1959, Ser. No. 834,572
Claims priority, application Germany Aug. 20, 1958
2 Claims. (Cl. 296—100)

The present invention relates to a lid, and more specifically, to a closure arrangement for vehicles, especially railroad freight cars and trucks. When transporting hygroscopic or humidity sensitive pourable goods such as burned or calcined lime, manuring lime, soda, cement, grain, etc., in rail vehicles or trucks, it is necessary properly to cover such vehicles. To this end, it has been suggested heretofore tiltably to mount the lid, which forms a part of the vehicle roof and extends over the entire length of the roof, about pivots arranged at the end faces of the vehicle. In this way, the closure lid will, when moving into its opening position, free a loading opening extending over the entire length of the vehicle or at least a loading opening into which loading chutes or the like can be inserted. The said device thus allows a continuous loading of the vehicle along its entire length. When particularly great car lengths are involved, according to the said heretofore known device, the lid is provided with supporting rollers supported by intermediate supporting means.

It is an object of the present invention to improve the above mentioned known closure arrangements so that also with great car lentghs, no intermediate supporting means will be required for properly supporting the central portion of the lid during the opening and closing operations of said lid.

It is a further object of this invention to provide a closure arrangement of the type set forth in the preceding paragraph, which will be relatively simple in construction and easy to handle.

These and other objects and advantages of the invention will appear more clearly from the following specification in connection with the accompanying drawing, in which:

FIG. 1 shows a perspective view of the car box and the closure.

FIGS. 2–5 illustrate details of the closure.

FIG. 6 is a vertical section through a portion of a car box and the closure arrangement therefor showing in heavy lines the lid in closure position and in dot-dash lines in opening position.

FIG. 7 illustrates on an enlarged scale with regard to FIG. 1 a section through the lid opening edge and also shows a partial section through the closure lid, said section being taken along the line II—II of FIG. 8.

FIG. 8 is a section along the line III—III of FIG. 2.

*General arrangement*

The closure arrangement according to the present invention is characterized primarily in that the central portion of the lid is provided with a plurality of adjacent supporting rollers protruding beyond the bottom side of the lid, while the car box is provided with an arched supporting rail mounted at the level of the rollers and adjacent the opening to be closed by the lid. When during the opening operation the lid bends, the supporting rollers arranged in front of the lid struts or braces will bring about that those portions of said struts or braces which protrude from the bottom side of the lid will not abut against the longitudinal ends of the loading opening whereby the tilting movement of the lid would be impeded. Those edges of the opening which face each other in longitudinal direction of the opening are provided with elements which will facilitate the movement of the supporting rollers upon the supporting rails on one side of the box opening and will also facilitate the movement of the supporting rollers located near one longitudinal edge of the lid upon the corresponding box edge when closing the lid.

*Structural arrangement*

Referring now to the drawing in detail, FIG. 6 shows a roof of a railroad freight car which is formed with longitudinal roof portions 2 having a longitudinal opening 3 extending therebetween substantially over the entire length of the freight car. This longitudinal opening is adapted to be closed by a closure lid 4. The ends of the closure lid are supported by arms tiltable about pivots at the end faces of the freight car.

In conformity with the present invention, the closure lid 4 is provided with supporting rollers 19, 20, 21 and 22. As will be seen from FIG. 6, the rollers 20, 21 are located in front of the reinforcements or stays 17, 18 of the closure lid when considering the opening movement of said lid as indicated by the arrow in FIG. 6. As will also be evident from the drawings, the rollers 19, 20, 21 protrude in downward direction beyond the bottom side of lid 4. The rollers 20, 21 are so arranged that their lowermost point will be located below the bottom side of the reinforcements or stays 17, 18.

Adjacent the opening 3 and in the opening direction of the lid 4 there is provided an arched supporting rail 23 mounted on a portion of the roof. The upper edge 24 (FIG. 7) of said rail 23 is in substantial alignment with the lower end 25 of the reinforcing member 26 forming a side edge of the opening 3.

The reinforcing member 26 as well as the reinforcing member 27 located opposite thereto are respectively provided with webs 28, 29 onto which the rollers 19 and 22 move when the lid is being moved into closing position.

When the closure lid 4 is being opened, the supporting rollers roll on the arched guiding rail 23. During this operation, in case the lid 4 should bend, the rollers 20, 21 will prevent that portion of the members 17, 18 which protrudes beyond the lower edge of the closure lid from hitting against the reinforcing member 26 whereby otherwise the opening movement of the lid would be impeded. The above mentioned two webs 28, 29 will assure a proper movement of the rollers 22 upon the reinforcing members 27 and also a proper movement of the rollers 20, 21 upon the arched supporting rail 23. If during the opening and closing operation, the closure lid 4 should bend, the said webs will assure that the respective lid section carrying the rollers will be lifted preferably only in the central portion.

It is, of course, to be understood that the present invention is, by no means, limited to the particular construction shown in the drawing, but also comprises any modifications within the scope of the appended claims.

What we claim is:

1. In a closure system for vehicles, especially trucks and railway freight cars: a vehicle body having front and rear end walls and longitudinal roof portions that extend inwardly from each side of said body and a loading opening extending between said longitudinal portions in an uninterrupted manner from the front end wall to the rear end wall, closure means adapted to extend over the entire length of said opening and movable in its entirety selectively from an opening position at one side only of said roof portions overlying one of said longitudinal portions in which position said loading opening is uncovered and into a closing position in which said opening is closed, means pivotally connecting said closure means to said end walls and adapted substantially to support said closure means, bearing means mounted on, and intermediate the ends, of said closure means so as to be between one of said longitudinal portions and said closure means when said closure means is in opening position and between both of said longitudinal portions and said closure means when said closure means is in closing position so as to support said closure means intermediate its ends on said fixed roof portions when in closing position and on one of said portions when in opening position.

2. The structure in claim 1, in which said bearing means comprise a plurality of roller bearings supported on said closure means and protruding downwardly beyond the bottom side of said closure means, and one of said longitudinal roof portions has an arched supporting rail mounted thereon and extending transversely in the path of said roller bearings to form a supporting track for said bearings.

References Cited in the file of this patent

UNITED STATES PATENTS

| | | |
|---|---|---|
| 312,786 | Wyman | Feb. 24, 1885 |
| 496,163 | Lebach | Apr. 25, 1893 |